United States Patent [19]
Manneschi

[11] Patent Number: 5,523,739
[45] Date of Patent: Jun. 4, 1996

[54] METAL DETECTOR FOR CONTROL OF ACCESS COMBINED IN AN INTEGRATED FORM WITH A TRANSPONDER DETECTOR

[76] Inventor: Alessandro Manneschi, 15, Via XXV Aprile (I), 52100 Arezzo, Italy

[21] Appl. No.: 434,685

[22] Filed: May 4, 1995

[30] Foreign Application Priority Data

May 31, 1994 [IT] Italy ................... AR94A0011

[51] Int. Cl.[6] .................................................. G08B 13/24
[52] U.S. Cl. ........................................... 340/552; 324/244
[58] Field of Search .............................. 340/572; 324/244

[56] References Cited

U.S. PATENT DOCUMENTS 3,839,709  10/1974  Sugiura ..................... 340/572
3,891,980  6/1975   Lewis et al. ............... 340/572
4,866,424  9/1989   Parks ......................... 340/572
5,241,298  8/1993   Lian et al. .................. 340/572

*Primary Examiner*—Glen Swann
*Attorney, Agent, or Firm*—Young & Thompson

[57] ABSTRACT

Metal mass detector (M.D.) operates on "foi" audio frequency transmissions provided in reception, with auxiliary circuitry for the processing of coded information signals, transmitted at "foi±Δf" ($fo_i = fo_1, fo_2 \ldots fo_n$, $1 \leq i \leq n$) adjacent to but not coinciding with the carrier frequencies of the transmission windings of the metal detector, combined with an active type, electronic transponder card with one or more windings forming a part of a high impedance circuitry for "foi" frequency signals.

7 Claims, 2 Drawing Sheets

METAL DETECTOR FOR CONTROL OF ACCESS COMBINED IN AN INTEGRATED FORM WITH A TRANSPONDER DETECTOR

BACKGROUND OF THE INVENTION

FIELD OF THE INVENTION

The invention consists in a metal detector combined in an integrated form with a transponder detector, aimed at the security sector and appropriate for positioning at points of controlled access and in particular at the entrances to places of places such as banks, embassies, military installations, airports and others that must be protected from the entry of armed persons.

DESCRIPTION OF THE RELATED ART

Already known Metal Detectors, indicated hereinafter as M.D., are made of one or more transmitting windings Txi, one or more receiving windings Rxi and electronic circuitry appropriate for the processing of the electric signals and for the activation of the electromechanical security systems when the signals received by the Rxi transducers undergo a variation with respect of a reference norm; this may be caused by the transit in the controlled passageway of a metal mass that can be assumed to be a weapon.

In order to prevent that metal masses located or placed near to the Txi Rxi transducers of the M.D. and magnetic fields produced by external sources, for example engine ignition units, from interfering in the functioning of the metal detector, the windings, both those assigned to the transmission of the signal and those assigned to its reception, normally have a multipolar configuration, i.e. polarities of opposite signs alternate within them so that the effects induced by these parasite signals will give rise to a null or a minimal signal in the Rxi transducer.

The frequency field on which these metal detectors operate is that of audio frequencies, normally between 1 KHz and 10 KHz, so that thin sheets of tin foil such as those in cigarette packs, very thin metal foils and any personal metal objects, such as keys or coins, will not cause a disturbance in the magnetic field produced by the Txi transmitters of such an amplitude as to be considered induced by the passage of a metal mass comparable to a weapon.

Txi and Rxi windings in M.D.s are therefore structured in such a way that the electromagnetic fields involved are aimed at a relatively small space and therefore are capable of verifying the presence of metal masses similar to weapons only in the space of transit of the passage under inspection and defined by the area between the Txi and Rxi antennas.

Furthermore, these windings are normally multiple and may be aimed in various directions, in order to make the induction of currents on metals transiting in the controlled area possible for any orientation and direction of trajectory.

Lastly, the magnetic field emitted by the Txi groups, has a low magnetic induction level in order to render it harmless for people wearing pacemakers.

There are also known transponder detectors formed by an antenna normally consisting of large or wide homopolar winding acting as a transmitter, placed close to the controlled access, and an electronic card, which holds an electromagnetic field transmitter/receiver, which is stimulated every time it enters the field of the transmitting antenna and reacts with a coded signal. When this signal radiating from the card is received by the above mentioned homopolar antenna, which also acts as a receiver, it is analyzed and if it corresponds to one of the qualified ones, it affects the control over the access, in particular it can "unlock" the security device, which may consist in an electro-mechanical system to block the opening of the doors.

In contrast, the person not carrying a transponder card or who has a transponder card which is not empowered to carry out a particular function, as for example the opening of a door, will not be able to pass through the door.

The transponder detector allows a remote reading of the "card" and therefore allows the carrier of the card to pass through the controlled passageway without having to stop.

These transponder detectors operate in a frequency field between 50 KHz and 450 KHz to allow the use of small sized cards with internal windings of few spirals; also, considering the shape of the antenna which is normally homopolar and radiates a field concentrated on its axis and its surroundings, it is required that the magnetic field it radiates must be quite intense so that the card can be intercepted throughout the entire passage under control, also in the case in which it is not perfectly oriented in respect of the flux emitted by the transmitter.

The increase in the intensity of the electromagnetic field is necessary in order to activate the transponder, even when transiting in positions with poor orientation, and implies the possibility of stimulation, in the cases of optimal orientation, even when the card is adjacent to but outside the controlled passageway. This may influence negatively the overall security of the access, as it may allow the passage of persons preceding the bearer of the card.

The two detecting groups, i.e. the M.D. and the Transponder Detector are therefore created to operate according to different and opposite logics, since, because of the structure and functional logic that governs the known systems, they cannot be combined together in order to allow an increase in the flow of people passing through the controlled access in total security, as requested by the security system operators.

The crossing of the passage controlled by the M.D. should be smoother for the card holders, for whom the M.D. would have a reduced sensitivity, allowing them to pass through the said access point with a higher level of discrimination on personal metal masses, by simplifying the transit procedures for these card holders. When the controlled entrance is used by non card holders or holders of non valid cards, the M.D. should then be used, operating on a high sensitivity level, risking a higher number of alarms—with, however, maximum security control.

The overall effect of this system is to provide maximum security and optimum transit flow.

Presently, the object of obtaining a smoother flow of traffic through passages controlled by a M.D. is obtained by combining the detector of metal masses with biometric readers or with magnetic card readers, through which authorized people undergo, in the first case the reading of part of their body while passing through the controlled passageway, whereas in the second case they insert the electromagnetic card into appropriate slot and at the same time they enter their personal code number. If the biometric reading or the reading of the electromagnetic card give the information corresponding to authorized or empowered users, the sensitivity of the M.D. is reduced or shut off, allowing their passage even if they are carrying sizeable metal masses.

However, these solutions increase security on one hand while on the other hand they require authorized persons to undergo a biometric control or to insert their personal electromagnetic card in the reader, this means an operation that may trouble it users as it obliges them to undergo control operations openly and clearly, thereby allowing ill-intentioned individuals the possibility to easily identify those who are empowered to cross the access under a lower level of control.

Furthermore, biometric controls often bring about complaints and doubts regarding hygiene.

Therefore the above mentioned solutions are actually non functionally acceptable.

SUMMARY OF THE INVENTION

The aim of this invention was to find an ingenious technical solution that could make the Transponder card compatible with the M.D. and that would allow their circuits to be integrated in order to reduce the cost of the detector, resulting from the combination of the two systems. Another aim was to create a compound detecting system that would not require qualified people to carry out any specific procedure while crossing the controlled passageway; a further aim was to create a compound detector that would reduce the sensitivity of the M.D. only when one of the authorized persons actually enters the controlled passageway, thus preventing any unauthorized person, preceding one carrying a transponder card, from entering through the passage just before the authorized one, when the sensitivity is low.

These results are obtained through the object of the present invention which consists of a compound detector composed of a Metal Mass Detector (M.D.) operating on "foi" ($fo_i=fo_1$, $fo_2$ . . . $fo_n$ $1 \leq i \leq n$) transmission audio frequencies (herein-after "foi") provided upon reception with an auxiliary circuitry for the processing of coded information signals, transmitted on frequencies that are adjacent to, but not coinciding with the M.D.'s "foi" frequencies. These codified signals are emitted by a transponder card, which is stimulated by the transmitting groups of the Metal Detector, and—by which all the means and/or the operative logic are activated to facilitate the flow of authorized persons when passing through the controlled passage—combined with active type electronic transponder cards. These cards are all equipped with RxTx winding/s closed on high impedance circuits for "foi" frequency signals, so that they are invisible to the signals and to the metal detector.

Such a compound detecting device has the following advantages:

- it uses at least the transmission/receiving antennas of the M.D. component also for the transponder detector component—with considerable financial savings and with a construction simplification—obtaining better aesthetic effects as the visible windings will have the appearance of flat panels or small columns;
- it uses the electronic circuitry of the metal detecting component M.D. for the pre-treatment of all the signals received, including those generated by the transducer of the transponder card;
- it uses multiple and multipolar electromagnetic fields typical of more sophisticated metal detectors which supply safer readings for all trajectories and orientations whether they be for the metal masses to be detected or for the transponder card;
- it uses magnetic field audio frequencies at a low intensity, not subject to government emission authorizations and corresponding to the rules of harmlessness codified by The International Standards For Pace-Maker wearers and for pregnant women;
- uses electromagnetic fields mainly focused in the area of the controlled space of transit between the transmitting and receiving antennas;
- it activates the transponder card in transit only when it is crossing the area between the transmitting and receiving antennas, with the effect of eliminating readings of cards in transit close to one of the antennas but still outside the controlled space, thus cancelling the risk of modifying the operational parameters of the metal detector for non-authorized persons;
- it uses cards with a Tx and a Rx winding, coinciding or distinct, closed on very high impedance for the "foi" frequencies used in the metal detecting component so that the passage of the card occurs unnoticed, therefore without altering the "foi" frequency fields of the metal detecting component as well as requiring a minimal use of energy, thus increasing the effective life of the incorporated electric generator.

BRIEF DESCRIPTION OF THE DRAWINGS

The invention is described in detail below, in its composite structure and functional logic, with reference to the enclosed illustrations that demonstrate the preferred technical solution, in which.

It is understood that the drawings have a demonstrative character and are presented exclusively as an illustration of the object of the invention in question without in any way constituting a limitation.

DETAILED DESCRIPTION OF THE PREFERRED EMBODIMENTS

Figure 1:
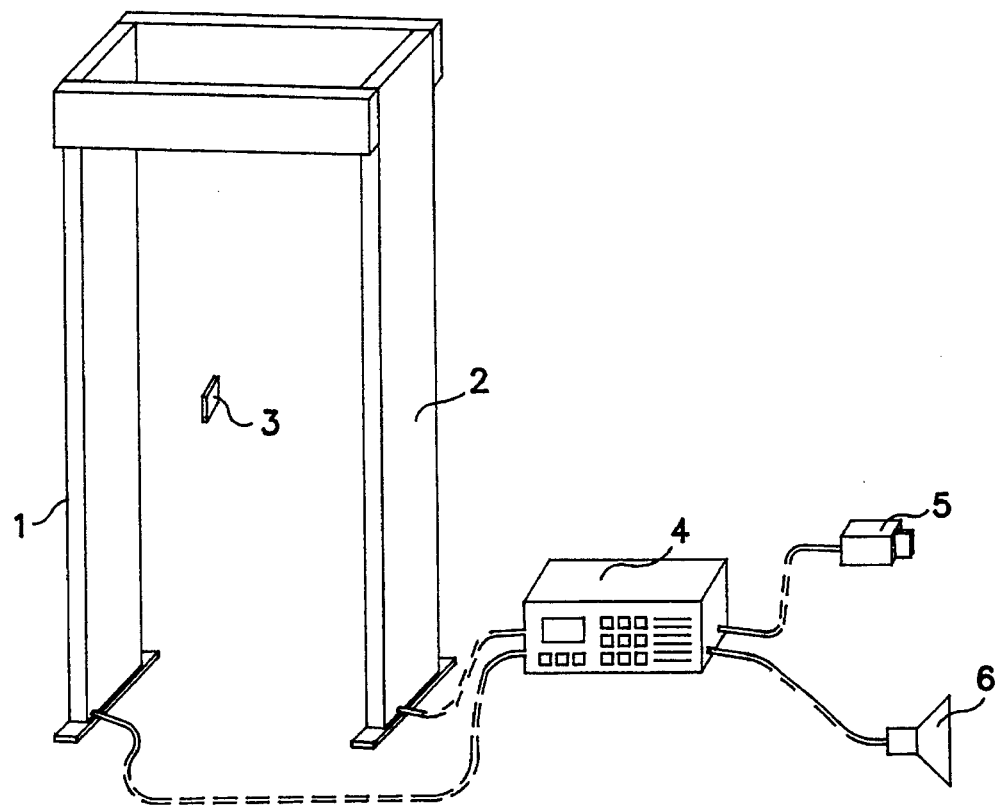
FIG. 1 is an example of the invention with the transducing antennae housed in panel shaped supports, controlled by an electronic circuitry housed in a box structure that is connected by cables to an electromechanical device for blocking of the doors and to an acoustic alarm signal device.
Figure 2:
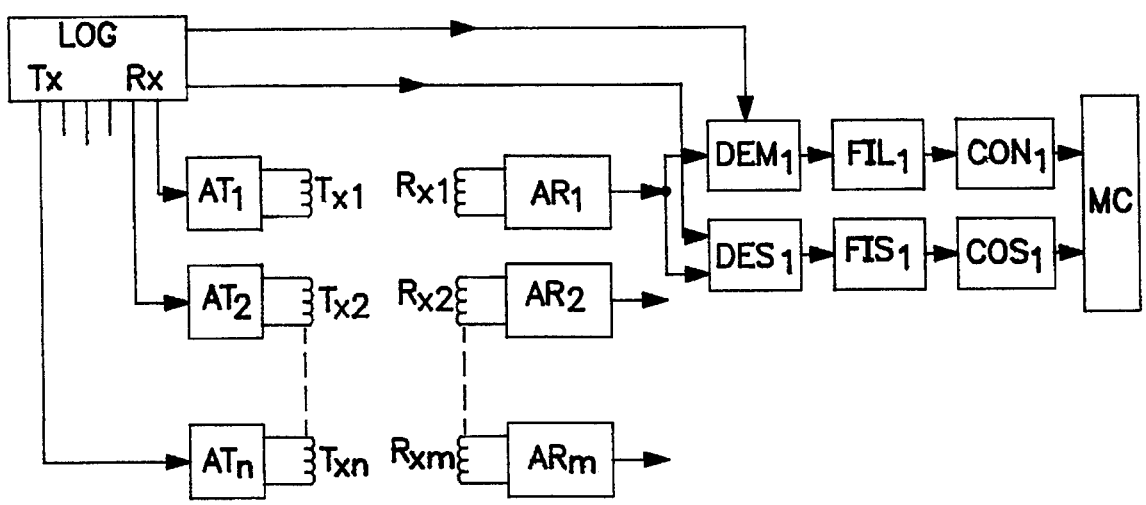
FIG. 2 is the block diagram that illustrates the metal detecting component (M.D.) in which the receiving group is equipped with circuitry in order to process the signals transmitted by the electronic card of the transponder detecting component.
Figure 3:
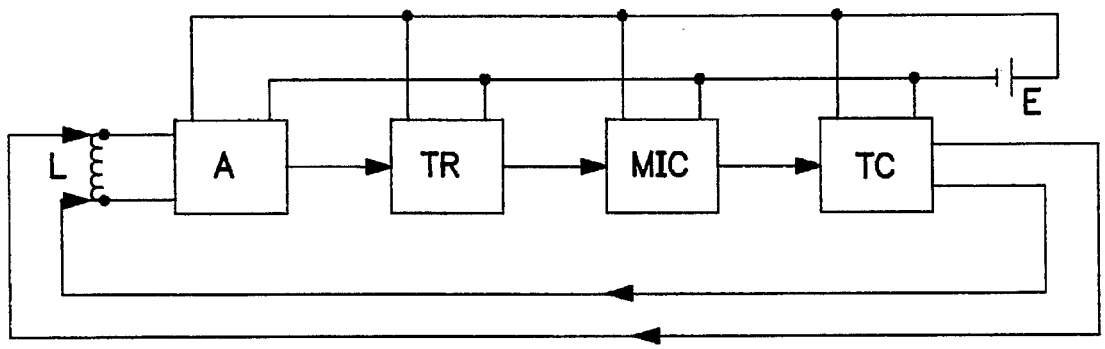
FIG. 3 is the block diagram that illustrates an active type electronic transponder card, with incorporated generator.

In the drawings we indicate with 1 and 2 the panels containing inside them the transmitting windings Txi (Txi= $Tx_1$, $Tx_2$ . . . $Tx_n$ $1 \leq i \leq n$) and the receiving windings Rxi (Rxi=$Rx_1$, $Rx_2$ . . . $Rx_n$ $1 \leq i \leq m$); with 3 we indicate the transponder card; with 4 is the box structure housing the electronic circuitry of the compound detector, with 5 an electro-mechanical group to block the means of closing the transit in the controlled access, with 6 the group that signals the alarm situation. In FIG. 2 with Log Tx Rx we indicate the electronic group that controls the transmitting groups and at least one receiving group; with AT1, AT2, ATn we indicate the amplifiers that precede the transmitting windings Tx1, Tx2, Txn; with Rx1, Rx2, Rxm we indicate the receiving windings; with AR1, AR2, ARm we indicate the received signals pre-treatment groups; with DEM1, FIL1 and CON1 respectively we indicate a demodulating group, a filter and converter relating to the circuitry of the metal detecting group associated to the receiver winding Rx1. With DES1, FIS1 and COS1 we indicate a demodulator, filter and analogic-digital converter relating to the transponder card 3 detecting group; with MC we indicate a computer group for the analysis of the signals. In FIG. 3, reproducing in the form of a block diagram the electronic transponder card, we indicate with E the generator, with A an amplifier group, with TR a trigger group, with MIC a microcomputer group, with TC a coded transmitting group, with L the winding acting as transducer receiver and transducer transmitter.

Figure 4:
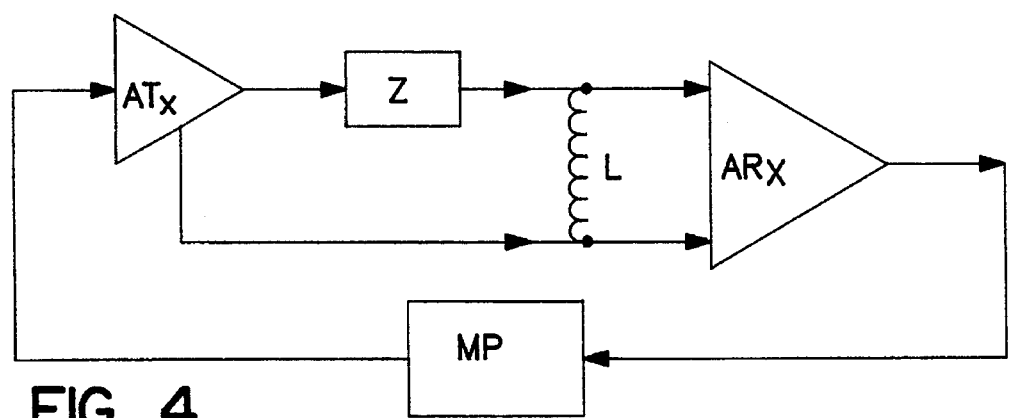
FIG. 4 is a simplified block diagram of the electronic card with the transmitting receiving winding closed on an extremely high impedance for "foi" frequencies specific for the metal detecting group.

In FIG. 4 instead we indicate with ATx a transmission amplifier, with Z an auxiliary impedance, with L the winding acting as electromagnetic transducer for the transmission and the reception of signals, with ARx the amplifier of the "foi" frequency signals received and with MP a microprocessor, whose signal is emitted at a frequency "foi±Δf" adjacent to but not coinciding with the "foi" frequencies.

In the preferred construction form shown in the designs, the invention includes two detectors integrated with one another, of which the first is aimed at detecting metal masses transiting in the controlled passageway and which is regulated in such a way that each metal mass crossing the controlled passageway which produces a variation of the magnetic field that is higher than a predetermined normal value, causes the stimulation the electromechanical group 5 and/or group 6. Group 5 is normally connected to one or more doors that can interrupt the passage to persons or things through the controlled access. Group 6 can signal an alarm situation, through the emission of an acoustic signal. Other devices commanded by the electronic control circuitry can also be included, among which for example, luminous signals and emitters of prerecorded messages. The second detector is a transponder type card in which a transmitting group and a receiving group interact with an electronic transponder card and from this interaction a response is given, following which, the holder of the is facilitated or impeded in the crossing of the controlled access point, for example through the reduction of the detection sensitivity of the metal detecting part, so as to allow the passage of a person holding an authorized card even if they hold a relevant metal mass, which would have provoked the activation of alarm groups 5 and 6 through the action of the metal mass detector group.

The electronic transponder card 3 is made up of a multi spiraled L winding and its transit through the controlled passageway does not cause consistent alterations of the "foi" frequency magnetic field, produced by the frequency transmitters of the metal detecting group, since it is closed on a very high impedance which allows the circulation in the L winding of a minimal current at "foi" frequency. However, this current is also capable of activating the trigger group TR and therefore the microcomputer MIC which controls the transmitting group TC, from which the outgoing signal has a frequency equal to "foi±Δf"; this latter is a different audio frequency—adjacent to but not coinciding with "foi"—so that it is distinct from the signals at "foi" frequency issued by the Txi transmitting groups of the metal detector M.D. (FIGS. 2 and 3). In particular the outgoing signal from the microcomputer MIC (FIG. 3) or from the microprocessor MP (FIG. 4) is amplified by the amplifier group TC or ATx then sent to the winding L. In FIG. 4, the Z impedance is indicated which, together with L, for the frequency signals "foi±Δf" gives rise to a condition of resonance due to which the signals at frequencies "foi±Δf" create a sensitive current which, in crossing winding L, create an electromagnetic field that is easily received by the transducers Rxi in common with the metal detector and transponder card detector. At the same time, for the "foi" frequencies that are specific for the metal detector, the ZL circuit presents a very high impedance which reduces the corresponding current to a minimum, so that it does not alter the magnetic field used by the metal detector unit; in this way, card 3 is invisible to the metal detector. Upon transit of the said card the alarm is not triggered, even if the card in transit is not authorized to allow the passage of the person bearing it, because, for example, it is relative to a different detection group. In this case card 3 passes unobserved and its possessor is analyzed by the metal detector component in question just like any unknown or extraneous person.

In substance, therefore, the invention is composed of a metal detector and transponder card detector both using the same transmission and receiving antennae housed in a panel shaped structure 1 and 2 or in a column shaped structure or according to other technically acknowledged structures. The two detecting groups are integrated with one another and in transmission they use electromagnetic waves at the same "foi" audio frequencies, while reception the metal detecting group still operates with signals at "foi" frequencies; the transponder card detector group operates with electromagnetic fields and signals at audio frequencies "foi±Δf", Δf being a frequency interval which allows, upon reception, the separation of the two signals.

The compound detector normally, as illustrated in FIG. 2, presents a multiple distinct plurality of transmission windings Txi (with "i" normally smaller than or equal to five) and an equal or different number of Rxi receiving windings, at least one of which,—placed after a pre-treatment group ARi common to all the signals received where these undergo at least one amplification,—has two branches of which the first (DEMi, FILi, CONi) is capable of analyzing the "foi" frequency signals relative to the metal detecting group and the second (DESi, FISi, COSi) elaborates the "foi±Δf" frequency signals issued by the electronic transponder card 3. With this elaboration the signal is demodulated in the DESi group, then filtered of unwanted signals in the FISi filter group. Following this the chosen signal is converted from analogic to digital in the COSi group and transmitted to the analyzing computer MC where it is processed and, if relative to a transponder card belonging to an authorized person—for example in the case of a bank with an employee or a well known client—the sensitivity of the metal detecting group is reduced allowing said person to transit also with sizeable metal masses, without provoking alarms and therefore without blocking access to the protected area, while maintaining the capacity to intercept firearms from predetermined sizes and upward.

The electronic transponder card or cards 3 are normally of the active type, which means they are equipped with their own electric generator, operating through the use of a miniature cell E, and they have one or two L windings for the reception of "foi" frequency signals and for the transmission of those produced within the same card at "foi±Δf" frequency. These windings, in the illustrations reproduced in FIGS. 3 and 4, coincide and are, in any case, characterized by the fact that they offer a very high impedance to the "foi" frequency currents that belong to the metal detecting group. In this way inside the L winding, during transit through the controlled passageway, there is no circulation of current at traceable values, so that there is no alteration in the electromagnetic field produced by the transmitting groups of the metal detector and this transponder card is invisible to the metal detector, that is, it does not provoke an alarm.

Said electronic card (3) L winding, operating as a transmitter, has in series a Z impedance of such a value that the ZL series and therefore the branch that contains them, works as a low resistance resonant circuit for the signals at "foi±Δf" frequencies; in this way the card, operating as a transmitter at "foi±Δf" frequencies, generates an electromagnetic field receivable by the receiving winding Rxi of the compound detector.

Therefore, on the one hand the card 3 is invisible for the metal mass detector, on the other hand for the transponder card detector it is active when placed in the delimited space under surveillance between transmitting antenna 1 and receiving antenna 2 of the invention.

I claim:

1. Metal detector for control of access points, integrated with a transponder card detector for monitoring a security zone for the control of points of access and in particular for entrance points into areas to be protected from the entry of armed persons, comprising a metal mass detector at foi audio frequencies, ($fo_i=fo_1, fo_2 \ldots fo_n$ $1\leq i\leq n$) provided with auxiliary detection circuitry for the processing of coded information signals transmitted at foi±Δf frequencies, by at least one transponder card which is activated by the transmission winding groups of the metal detector combined with active type electronic transponder cards, with at least one winding forming part of a high impedance circuit for foi frequency signals.

2. Metal detector as claimed in claim 1 wherein the metal detecting group and the transponder card detecting group both use the same transmitting and receiving antennae.

3. Metal detector as claimed in claim 1 wherein the metal detector and the transponder card detector use, during transmission, the same electromagnetic waves at the same foi audio frequencies.

4. Metal detector as claimed in claim 1 wherein the metal detector and the transponder card detector use, in reception, electromagnetic fields and signals at different audio frequencies, these audio frequencies being adjacent but not coinciding.

5. Metal detector as claimed in claim 1 wherein the auxiliary detection circuitry for the processing of the signals received presents at least one pre-treatment group common to the received signals, it then divides into two branches, of which the first one being for the processing of the foi frequency signals while the second being for the signals issued by the transponder card at foi±Δf frequencies.

6. Metal detector as claimed in claim 1 wherein said at least one transponder card is equipped with its own electric power generating unit and by one or two windings having very high impedance for foi frequency signals belonging to the metal detecting group.

7. Metal detector as claimed in claim 1 wherein said at least one winding of the transponder card operating as a transmitter has in series an impedance which makes the branch that contains both of them of low impedance for the transmission frequencies foi±Δf of the transponder and of high impedance for the foi frequency transmissions of the metal detecting group.

* * * * *